July 12, 1966   R. A. BOSTWICK   3,260,908
FOLLOW UP MOTOR CONTROL SYSTEM INCLUDING PROVISION FOR BRAKING
Filed March 8, 1963
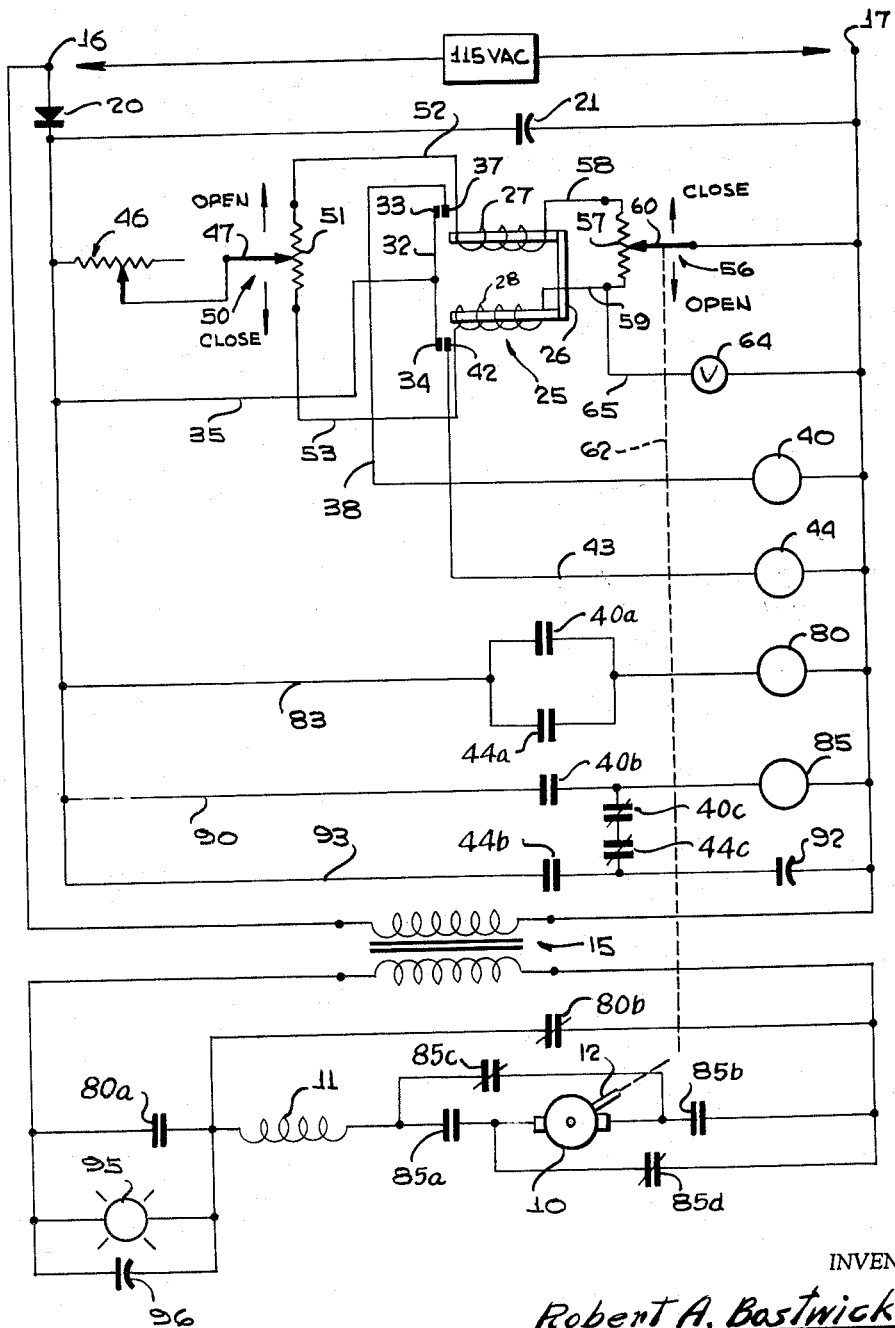
INVENTOR
*Robert A. Bostwick.*
BY *Searman Searman & McCulloch.*
ATTORNEYS United States Patent Office 3,260,908
Patented July 12, 1966

3,260,908
FOLLOW UP MOTOR CONTROL SYSTEM INCLUDING PROVISION FOR BRAKING
Robert A. Bostwick, Saginaw, Mich., assignor to A. T. Ferrell & Co., Saginaw, Mich., a corporation of Michigan
Filed Mar. 8, 1963, Ser. No. 263,774
7 Claims. (Cl. 318—28)

The present invention relates to a new and novel motor control system, and more particularly to a system which is especially adapted to accurately and precisely position a driven member.

In many modern industries, and in particular in the grain, seed and feed industry, there exists today a need for plant automation so as to provide for automatic materials handling systems such as are required for example in feeding grain from elevators into supply and garner bins or the like.

In order to provide automation in such systems, it is necessary to provide an arrangement whereby certain driven members such as valves or the like can be controlled from a central location, and it is furthermore necessary in many instances that such remotely controlled members be very accurately positioned in order to obtain the desired results. It is accordingly a particular feature of the present invention to provide a motor control system wherein a valve or similar driven member is connected with a means for power driving the driven member into a desired position.

In the past, remotely controlled mechanisms such as air cylinders or electrically operated devices have been proposed, but these prior art arrangements have proved unsatisfactory for a variety of reasons. In the present invention, the driven member such as a valve or the like is operatively connected with the motor output shaft of an electric motor, and a control circuit is associated with the electric motor for providing the desired degree of control.

Since it is essential with this type of a system to position the driven member in a precise and accurate manner, it is necessary that the control circuit of the present invention causes the driving electric motor to stop precisely and smoothly at a selected position.

A further feature of the present invention is the fact that the control circuit is so designed that the overall system gives ample power and enables the system to be wired with low voltage cables which is of course advantageous.

The system of the present invention also incorporates a manual control device for selecting the desired position of the driven member, this manually operated control means cooperating with a further control means which is operatively connected to and driven by the motor output shaft of the driving electric motor to accurately seek the proper position as determined by the setting of the manual control means.

An object of the present invention is to provide a new and novel motor control system for drivingly positioning a suitable driven member such as a valve and the like in a predetermined position.

Another object of the invention is the provision of a motor control system including an electric driving motor and a control circuit operatively connected with the driving motor causes the motor to stop precisely and smoothly at a selected position.

A further object of the invention is to provide a motor control system which gives ample power and which enables it to be wired with low voltage cables.

Still another object of the invention is to provide a motor control system including a manual control for selecting the desired position of a driven member and means for causing the drive motor to seek the proper position.

Other objects and many attendant advantages of the invention will become more apparent when considered in connection with the specification and accompanying drawing, wherein:

The drawing is a schematic wiring diagram illustrating the motor control system of the present invention including a driving electric motor which is adapted to be connected with a suitable driven member and a control circuit for the motor.

Referring now to the drawing, there is shown an electric motor including an armature 10 and a field coil 11, the armature being connected with the motor output shaft indicated schematically by reference numeral 12. The armature and field coil of the electric motor are connected across the secondary of a transformer 15 through the intermediary of a circuit including relay contact means which will be hereinafter more fully explained.

As seen at the top of the figure, a pair of input terminals 16 and 17 are adapted to be connected across a suitable source of electrical energy such as a conventional 115 volt A.C. power source. Input terminals 16 and 17 are connected across the primary coil of the transformer 15.

Rectifier 20 and filter condenser 21 supply a filtered source of D.C. for the control circuit of the system. The control circuit includes a control means, the control means firstly including a balanced relay switch means indicated generally by reference numeral 25 and including a core means 26 which is preferably an integral generally U-shaped member as shown. The leg portions of the core means have operating coils 27 and 28 associated therewith.

The balanced relay switch means includes an armature 32 pivotally supported at its central portion and including a pair of contacts 33 and 34. The armature is normally biased into its neutral position as shown on the drawing wherein the contacts 33 and 34 are in open circuit condition. Armature 32 is connected by means of lead 35 to one side of the D.C. line.

Contact 33 of relay armature 32 is adapted to engage a contact 37 which is in turn connected through lead 38 with one side of opening relay 40, the other side of which is connected to the other side of the D.C. line. The contacts of relay 40 will be hereinafter described.

Contact 34 of relay armature 32 is adapted to engage a contact 42 which is connected through a lead 43 with one side of closing relay 44, the opposite side of which is connected with the other side of the D.C. line.

One side of the D.C. line is connected through a sensitivity or level control variable resistor 46 with the movable member or wiper 47 of a manually operable control potentiometer indicated in its entirety by the reference character 50. Potentiometer 50 comprises a resistor 51 one end of which is connected through lead 52 with one end of coil 27, while the opposite end of resistor 51 is connected through lead 53 with one end of coil 28.

A motor driven potentiometer 56 comprises a resistor 57 one end of which is connected through lead 58 with the opposite end of coil 27, while the opposite end of resistor 57 is connected through lead 59 with the opposite end of coil 28. Potentiometer 56 also includes a movable member or wiper 60 which is connected with the opposite side of the D.C. line. A dotted line 62 indicates schematically a driving connection between the electric motor output shaft 12 and the wiper 60 of potentiometer 56. This driving connection may take any suitable form and enables the wiper of potentiometer 56 to be positively power operated in accordance with movements in opposite directions of the motor output shaft 12 as will be more fully hereinafter described.

A suitable indicating device such as a voltmeter or the like is indicated by reference numeral 64, this indicating device being connected through a lead 65 with one end of the resistor 57 of the potentiometer 56, the indicating device also being connected with the other side of the D.C. line. This indicating device indicates the position of the wiper 60 of potentiometer 56 which in turn reflects the position of the output shaft 12.

Relay 40 includes a coil and a plurality of contacts 40a, 40b and 40c. Contacts 40a as well as contacts 40b are normally open, and contacts 40c are normally closed when the relay is de-energized. Relay 44 includes a coil and a plurality of contacts 44a, 44b and 44c. Contacts 44a and 44b are normally open and contacts 44c are normally closed when the relay is de-energized.

A starting and braking relay 80 includes a coil and a plurality of contacts 80a and 80b, contacts 80a being normally open and contacts 80b being normally closed when the relay is de-energized. The operating coil of relay 80 is connected across the D.C. line through lead 83 and either the normally open contacts 40a of relay 40 or the normally open contacts 44a of relay 44.

A reversing relay 85 includes an operating coil and a plurality of contacts 85a, 85b, 85c and 85d. Contacts 85a and 85b are normally open while contacts 85c and 85d are normally closed when the relay is de-energized. The upper end coil of relay 85 is connected across the D.C. line through the intermediary of lead 90, and the normally open contacts 40b of relay 40.

A time delay capacitor 92 is connected across the D.C. line through the intermediary of lead 93 and the normally open contacts 44b of relay 44. Capacitor 92 is connected in a discharge circuit through the operating coil of relay 85 when contacts 40c and 44c are closed.

A pilot light 95 is connected in shunt across contacts 80a of relay 80, and capacitor 96 is also connected in shunt across contacts 80a, for preventing arcing of contacts 80a.

*Operation*

As discussed previously, the motor output shaft 12 is connected to any suitable driven member, and for the purpose of illustration it will be assumed that this shaft is connected with a valve, the position of which it is desired to accurately control. Let us assume that the system is in a balanced condition as shown on the drawing with the control potentiometer and the motor driven potentiometer in substantially their center positions as illustrated. With the potentiometers in this position, the current through coils 27 and 28 will be balanced which accordingly will cause the relay armature 32 to be biased into its neutral position as illustrated wherein contacts 33 and 34 will be open. In this condition, each of relays 40, 44, 80 and 85 are de-energized and the motor is at rest.

It is assumed firstly that it is desired to move the driven member to a more open position, and accordingly, the manually controlled potentiometer 50 will be operated so as to move the wiper 47 thereof in an upward direction as seen on the drawing and as indicated in an opening direction. As wiper 47 is moved upwardly, more current flows through coil 27 than through coil 28. This causes an unbalance in relay switch means 25 which causes armature 32 to be drawn in such a direction as to close contacts 33 and 37. When contacts 33 and 37 are closed, relay 40 is energized through the circuit defined by leads 35, contacts 33 and 37 and lead 38.

Upon energization of the operating coil of relay 40, contacts 40a and 40b thereof are closed and contacts 40c are opened. Closure of contacts 40a causes energization of relay 80 and closure of contacts 40b causes energization of relay 85 while the opening of contacts 40c de-energizes the time delay circuit for relay 85.

Upon energization of relay 80, contacts 80a are closed thereby connecting the electric motor across the secondary of transformer 15, and contacts 80b are opened thereby releasing the braking circuit for the electric motor.

Relay 85 which is energized at the same time as relays 40 and 80 closes normally open contacts 85a and 85b and opens normally closed contacts 85c and 85d to thereby cause the motor to be driven in a direction so as to move the driven member towards its open position.

As the electric motor is driven in the open direction, the output shaft 12 will drive the motor driven potentiometer wiper 60 towards its open position or in a downward direction as seen in the figure. The wiper of the motor driven potentiometer will be driven downwardly until the motor driven potentiometer and the manually operated potentiometer 56 and 50 respectively are in such positions as to equalize the current through the coils 27 and 28 of the relay switch means 25.

When the current through coils 27 and 28 is thus balanced, the armature 32 of the relay will return to its neutral position with contacts 33 and 34 both open.

This causes relay 40 to be de-energized which in turn opens contacts 40a and 40b and closes contacts 40c. Opening of contacts 40a de-energizes relay 80 which in turn causes contacts 80a to open thereby disconnecting the motor from the secondary of transformer 15. At the same time, de-energization of relay 80 causes contact 80b to close which closes the braking circuit to the motor which causes the motor to stop precisely and smoothly. As contacts 40b open, relay 85 is de-energized which in turn causes contacts 85a and 85b to open and contacts 85c and 85d to close which effectively reverses the motor connections so that the braking circuit will bring the motor to a stop.

Let us now assume that it is desired to move the driven member toward a closed position. In this case, the wiper 47 is moved downwardly as seen in the figure toward the closed direction thereby causing an unbalance in coils 27 and 28 which causes more current to flow through coil 28 which in turn will attract the relay armature 32 such that contacts 34 and 42 are closed.

Closure of contacts 34 and 42 will close the circuit through relay 44 and energize this relay through the intermediary of lead 35, contacts 34, 42 and lead 43.

When relay 44 is energized, contacts 44a are closed, contacts 44b are closed, and contacts 44c are open. Closure of contacts 44a causes relay 80 to be energized which in turn closes contacts 80a to energize the motor and opens contacts 80b to release the motor brake circuit.

Closure of contacts 44b and opening of contacts 44c causes the time delay capacitor 92 to be connected across the D.C. line thereby causing the capacitor to be charged, and relay 85 remains in its de-energized condition.

Since relay 85 is de-energized, contacts 85a and 85b remain open while contacts 85c and 85d remain closed. It is apparent that with this relationship, the motor will be driven in the opposite direction as was the case when the control potentiometer was manipulated to move it in its opening direction.

As the driven output shaft moves in the closing direction, the wiper 60 of the motor driven potentiometer 56 will be moved in its closing direction or upwardly as seen in the drawing. The wiper 60 will continue to move upwardly until it reaches a condition wherein the relative positions of the wipers of the two potentiometers are such that the current through the coils 27 and 28 is equalized. Upon equalization of this current, relay armature 32 will again be biased to its neutral position wherein contacts 34 and 42 are opened.

Upon opening of contacts 34 and 42, relay 44 is de-energized which in turn causes contacts 44a and 44b to open while contacts 44c are closed. Opening of contacts 44a causes relay 80 to be de-energized which causes contacts 80a to be opened and contacts 80b to be closed, thereby disconnecting the motor from the power source and closing the braking circuit.

Closure of contacts 44c closes the discharge circuit through relay 85 and causes the relay 85 to be energized for a predetermined time interval by time delay capacitor 92.

Energization of relay 85 under the influence of the discharge of capacitor 92 causes contacts 85a and 85b to close and contacts 85c and 85d to open. This effectively reverses the connections on the motor and produces in conjunction with the closing of contact 80b a braking action causing the motor to be brought to a stop.

When capacitor 92 is completely discharged, relay 85 will be de-energized again opening contacts 85a and 85b and closing contacts 85c and 85d to return the circuit to its normal or de-energized condition.

The pilot light 95 gives an indication of the operative condition of the circuit, the light being normally lit when the motor is not running and being extinguished when the motor is running.

It is apparent from the foregoing that there is provided a new and novel motor control system for drivingly positioning a suitable driven member such as a valve and the like in a pre-determined position. A control circuit is operatively connected with the electric driving motor in such a manner that when a desired position of the driven member is reached, the circuit causes the motor to stop precisely and smoothly at a selected position utilizing a dynamic braking effect to obtain a rapid and accurate stopping of the motor in a precise location. The motor control system gives ample power and enables it to be wired with low voltage cables. The manually controllable potentiometer permits accurate positioning of the driven member from a remote location, and the balanced relay switch means which is connected in circuit with the manually controllable potentiometer and the motor driven potentiometer in such a manner to form a bridge circuit provides a control means which is adapted to cause operation of the various relays having the aforesaid relay contacts associated therewith to cause the electric driving motor to seek the proper position such that the driven member is accurately located whereupon the motor driven potentiometer causes the control means to be balanced in such a manner that the drive motor is automatically stopped in the desired position.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A motor control system including an electric motor having an output shaft adapted to be connected to a driven member and precisely and smoothly stop a driven member in a selected position, said system including a motor control circuit connected with said motor, said motor control circuit including input terminals adapted to be connected with a source of electrical energy, a braking circuit connected with said motor for stopping the motor, control means including a balanced relay switch means, said balanced relay switch means including a core means, a pair of coils associated with said core means, a movable armature mounted for movement in opposite directions and oriented such that the movable armature is moved in one direction or the other by whichever of the coils is carrying the greatest amount of current, said movable armature being electrically connected to one of said coils, said control means including a selectively operable variable impedance means including a movable means and a resistance means, said movable means being connected to one of said terminals, one end of said resistance means being connected to one end of one of said coils, the opposite end of said resistance means being connected to one end of the other of said coils, said control means also including a second variable impedance means having a movable means and a resistance means, one end of the resistance means of said second variable impedance means being connected with the opposite end of said one coil, the other end of the resistance means of said second variable impedance means being connected with the opposite end of said other coil, the movable means of said second variable impedance means being connected with the other of said electrical terminals and being drivingly connected with said output shaft, said movable armature including two sets of contacts which are alternately opened and closed upon movement of the armature in response to an unbalance of current in said coils, an opening relay, one set of said armature contacts being connected with one side of said opening relay, the opposite side of said opening relay being connected to the other of said terminals, said opening relay including first and second normally open contacts and normally closed contacts, a closing relay, the other set of said armature contacts being connected with one side of said closing relay, the opposite side of said closing relay being connected to the other of said terminals, said closing relay including first and second normally open contacts and normally closed contacts, and a starting and braking relay, one side of said starting and braking relay being connected to one of said terminals through either the first normally open contacts of said opening relay or the first normally open contacts of said closing relay, the opposite side of said start and brake relay being connected to the other of said terminals, said start and brake relay including first normally open contacts electrically connected with said motor and said terminals for energizing and de-energizing said motor, said start and brake relay also including normally closed contacts connected in said braking circuit for opening or closing said braking circuit.

2. A motor control system as defined in claim 1, including a reversing relay, one side of said reversing relay being connected to said one terminal through the second normally open contacts of said opening relay, the opposite side of said reversing relay connected to said other terminal, said reversing relay including first and second normally open contacts and first and second normally closed contacts, said first and second normally open contacts being alternately opened and closed simultaneously with respect to said first and second normally closed contacts so as to reverse the polarity and therefore reverse the direction of rotation of the motor.

3. A system as defined in claim 2, including time delay means, one side of said time delay means being connected to said one terminal through the second normally open contact of said closing relay, the opposite side of said time delay means being connected to the other of said terminals, said time delay means being connected to discharge through said reversing relay through the intermediary of said normally closed contacts of said opening relay and said normally closed contacts of said closing relay.

4. Apparatus as defined in claim 1, including means normally biasing said relay armature into a neutral position wherein both sets of contacts of the movable armature are open when the current in said coils is substantially equal.

5. A motor system as defined in claim 1, including sensitivity adjustment means operatively connected with said first variable impedance means for controlling the sensitivity or operating level of the control circuit.

6. A motor control system including an electric motor having an output shaft adapted to be connected to a driven member and previsely and smoothly stop a driven member in a selected position, said system including a motor control circuit connected with said motor, said control circuit including input terminals adapted to be connected with a source of electrical energy, a motor shorting braking circuit connected with the motor for dynamically stopping the motor when the braking circuit is closed, said motor control circuit including first means for connecting said motor to said terminals and driving the motor in a forward or reverse direction, means operated by said first means for opening and closing said braking circuit, said motor control circuit including control means for controlling the operation of said first means for driving the motor in either direction as desired, said control means including a balanced relay switch means operatively connected with said first means, said control means including a selectively operable variable impedance means, a second variable impedance means, said second variable impedance means including a movable means drivingly connected with said output shaft, said balanced relay switch means and both said vairable impedance means being connected to define a bridge circuit, and motor reversing means operated by said first means for reversing the polarity of the motor at substantially the time said braking cricuit is closed to stop the motor.

7. A motor control system including an electric motor having an output shaft adapted to be connected to a driven member and precisely and smoothly stop a driven member in a selected position, said system including a motor control circuit connected with said motor, said motor control circuit including input terminals adapted to be connected with a source of electrical energy, a braking circuit connected with said motor for stopping the motor, control means including a balanced relay switch means, said control means also including a selectively operative variable impedance means, a second variable impedance means, said second variable impedance means including a movable means drivingly connected with said output shaft, said balanced relay switch means and both said variable impedance means being connected to define a bridge circuit, an opening relay connected with said balanced relay switch means, said opening relay including first and second normally open contacts and normally closed contacts, a closing relay connected with said balanced relay switch means, said closing relay including first and second normally open contacts and normally closed contacts, and a starting and braking relay connected to one of said terminals through either the first normally open contacts of said opening relay or the first normally open contacts of said closing relay, the opposite side of said start and brake relay being connected to the other of said terminals, said start and brake relay including first normally open contacts electrically connected with said motor and said terminals for energizing and de-energizing said motor, said start and brake relay also including normally closed contacts connected in said braking circuit for opening or closing said braking circuit.

References Cited by the Examiner

UNITED STATES PATENTS

| | | | |
|---|---|---|---|
| 2,471,075 | 5/1949 | Montrose-Oster | 318—29 |
| 2,508,162 | 5/1950 | Herwald | 318—29 |
| 2,704,819 | 5/1955 | Bishofberger | 318—29 |
| 2,753,499 | 7/1956 | Dion | 318—29 |
| 2,863,107 | 12/1958 | Blauvelt | 318—28 |
| 2,866,150 | 12/1958 | Lewis | 290—40 |
| 2,971,142 | 2/1961 | Montross | 318—29 |

ORIS L. RADER, *Primary Examiner.*

G. SIMMONS, *Assistant Examiner.*